United States Patent [19]
Stickle

[11] Patent Number: 6,073,544
[45] Date of Patent: Jun. 13, 2000

[54] TACO CENTERING APPARATUS

[75] Inventor: John S. Stickle, Plano, Tex.

[73] Assignee: The Double "JJ" Corporation, Dallas, Tex.

[21] Appl. No.: 09/067,431

[22] Filed: Apr. 27, 1998

[51] Int. Cl.[7] .................................................. A47J 37/12
[52] U.S. Cl. ............................... 99/404; 99/353; 99/427; 99/443 C
[58] Field of Search ..................... 99/427, 431, 403–410, 99/443 R, 443 C, 477–479, 353–355; 198/406, 836.1; 425/394, 412, 452

[56] References Cited

U.S. PATENT DOCUMENTS

| 3,570,393 | 3/1971 | Schy | 99/404 |
|---|---|---|---|
| 3,653,337 | 4/1972 | Hanson | 99/426 |
| 3,667,372 | 6/1972 | Hilvitz et al. | 99/427 X |
| 3,680,474 | 8/1972 | Brown | 99/353 |
| 3,722,400 | 3/1973 | Jimenez | 99/355 X |
| 3,763,764 | 10/1973 | Schy | 99/353 |
| 3,766,846 | 10/1973 | Jimenez | 99/404 X |
| 3,861,289 | 1/1975 | Baker et al. | 99/443 C |
| 3,946,655 | 3/1976 | Schy | 99/407 X |
| 3,948,160 | 4/1976 | Stickle | 99/404 |
| 4,154,153 | 5/1979 | Stickle | 99/404 |
| 4,380,191 | 4/1983 | Gallegos et al. | 99/407 X |
| 4,760,775 | 8/1988 | Hoskins | 198/406 X |
| 5,743,174 | 4/1998 | Stickle | 99/404 |

*Primary Examiner*—Timothy Simone
*Attorney, Agent, or Firm*—Sidley & Austin

[57] ABSTRACT

A taco frying apparatus (90) is disclosed which permits the tortilla (12) to be trapped between a mesh (30) and a mold (120) to confine the tortilla and create a taco with a uniform u-shape. The mold (120) can pivot between the capture position with a taco captured there between and a loading position to allow a tortilla to be placed on the mesh for cooking or to remove the fried taco. Operating lugs (40) on end plates (34, 36) mounted on the mold can be used to pivot the mold. A portion of a hinge assembly (100) can move within the mold in the capture position.

15 Claims, 10 Drawing Sheets

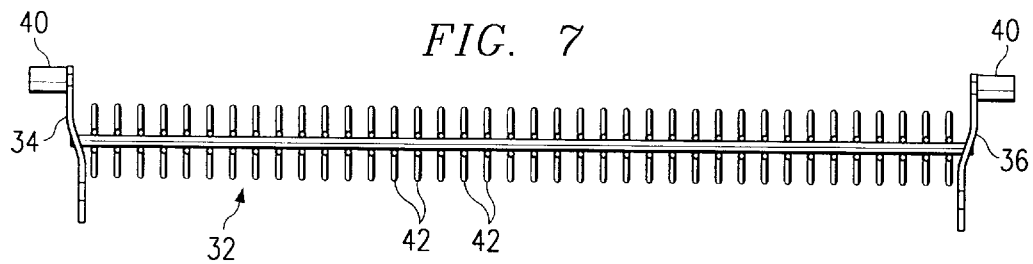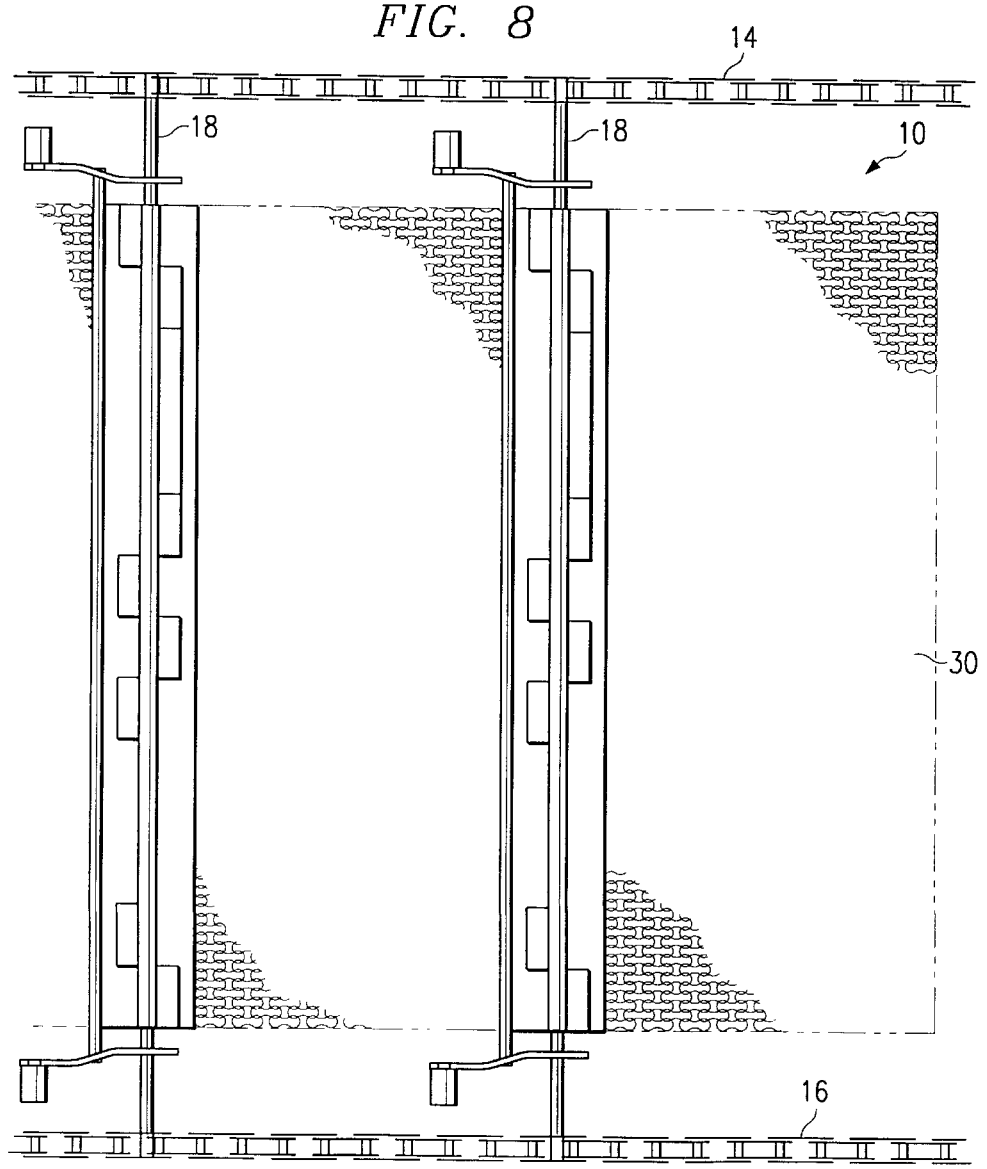

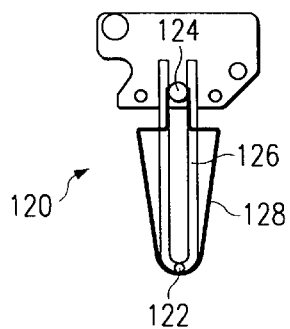
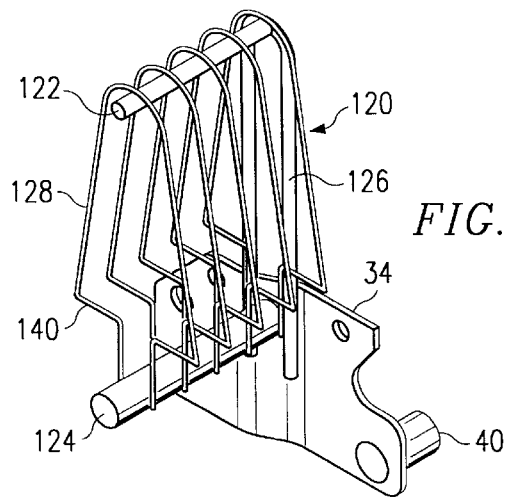
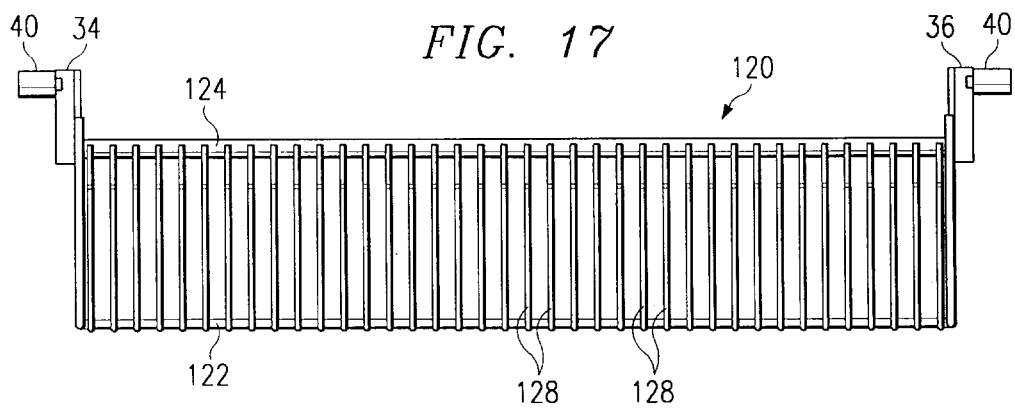

TACO CENTERING APPARATUS

TECHNICAL FIELD OF THE INVENTION

This invention relates to an apparatus for frying tacos in a commercial production environment.

BACKGROUND OF THE INVENTION

Tacos are a popular food. Many people buy precooked taco shells from the grocery store and a significant industry exists to produce the taco shells in commercial processes.

Most processes involve placing the baked tortilla in a taco frying machine and passing the taco through a vat of hot oil to fry the taco. A number of mechanisms exist to fry the tacos at commercially acceptable speeds. However, a problem often exists in positioning the tortilla precisely in the machine to form a uniform final product. Nonuniform tacos, commonly known as J's because one leg of the taco is longer than the other, create problems in packaging. The lack of consistency found in commercial products requires a package design which is larger and more bulky than would be necessary if the tacos were more uniformly unshaped, i.e., the legs of the tacos are of equal length and the tacos are symmetric. This inefficiency costs more in packaging materials and additional shelf space at the stores.

In prior designs, it is common to use a set of four pins to position the tortilla on a wire mesh for frying. Commonly, an 8 inch long mesh is utilized for frying all size tortillas with a diameter less than 8 inches. For example, a standard 5½ inch diameter tortilla would be positioned on the mesh relative to the four pins, working in dual pairs, which rise up from underneath the mesh to about ½ inch above the mesh. Ideally, the forward edge of the tortilla will contact both forward pins so that the forward portion of the tortilla lies between the forward pins and extends ahead of the forward pins. However, in practice, if the tortilla is offset sideways at all, the tortilla will likely only hit one of the forward pins and not be located as forward on the mesh as an ideal position. Also, the tortilla will occasionally drop on the pins and stick to the pins. This has lead to the creation of J's, i.e., tacos with one side shorter than the other, and other unacceptable results.

A need therefore exists for an improved taco fryer which will make the product more uniform.

SUMMARY OF THE INVENTION

In accordance with one aspect of the present invention, a taco centering apparatus is provided. The apparatus includes first and second parallel chain elements. First and second rods extend between the first and second chain elements with the first and second rods parallel each other and spaced a predetermined distance along the chain elements from each other. A first hinge assembly is pivotally mounted to the first rod. A mesh extends between the first and second rods and is secured at one end thereof to the first hinge assembly. A mold is pivotally mounted to the first rod for pivotal motion between a first release position exposing the mesh and a second captured position with the mesh placed over the mold. A tortilla placed on the mesh is positioned and formed as the mesh is placed over the mold. A portion of the first hinge assembly is received within the mold in the second captured position.

In accordance with another aspect of the present invention, a hinge is pivotally mounted on the first rod, the hinge having a first hinge half and a second hinge half, the mesh being secured to the first rod through the first hinge half.

In accordance with another aspect of the present invention, the mold has a pivot plate at a first end thereof The pivot plate is pivoted to the first rod and has an extension therefrom to move the mold between the first and second positions.

BRIEF DESCRIPTION OF THE DRAWINGS

A more complete understanding of the invention and its advantages will be apparent from the following detailed description when taken in conjunction with the accompanied drawings, in which:

FIG. 7 is a bottom view of the wire mold,

FIG. 8 is a plan view of the embodiment of the present invention;

FIG. 15 is a side-view of the wire mold;

FIG. 16 is a perspective view of the wire mold;

FIG. 17 is a plan view of the wire mold;

DETAILED DESCRIPTION OF THE INVENTION

Figure 1:
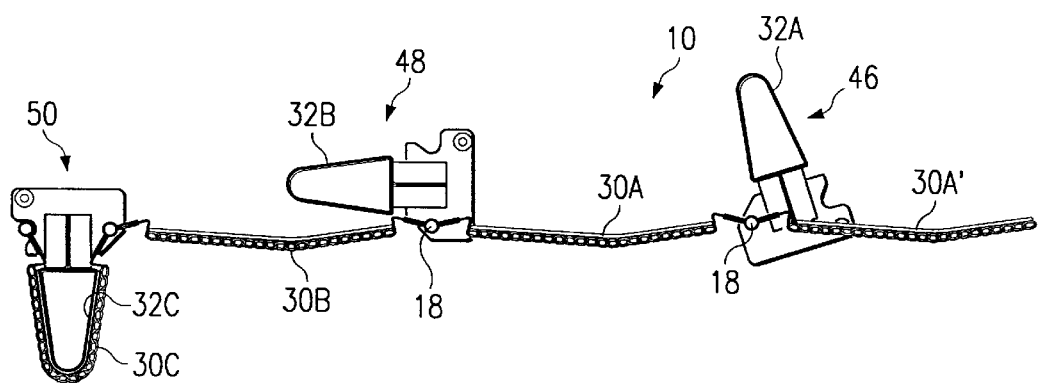
FIG. 1 is a illustrative view of a first embodiment of the present invention.

Referring now to the drawings, wherein like reference characters designate like or corresponding parts throughout the several views, there is shown in FIG. 1 a taco frying apparatus 10 which forms a first embodiment of the present invention. The apparatus 10 is mounted on a taco fryer (not shown) which has a vat of cooking oil which is heated to the desired temperature to cook a taco (tortilla) 12. The taco fryer can be of the type disclosed in U.S. Pat. No. 4,154,153 issued May 15, 1979 to Daniel T. Stickle, which patent is hereby incorporated herein in its entirety. As can be seen in FIG. 8, the apparatus 10 includes a first drive chain 14 and a second drive chain 16 which are mounted on the taco fryer for a continuous cycling motion as is well understood in the industry.

Figure 5:
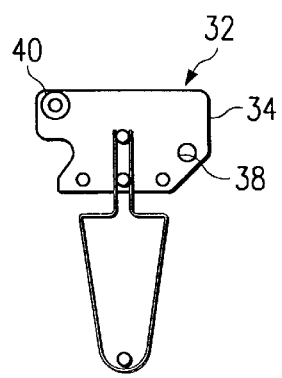
FIG. 5 is a side view of the wire mold.
Figure 6:
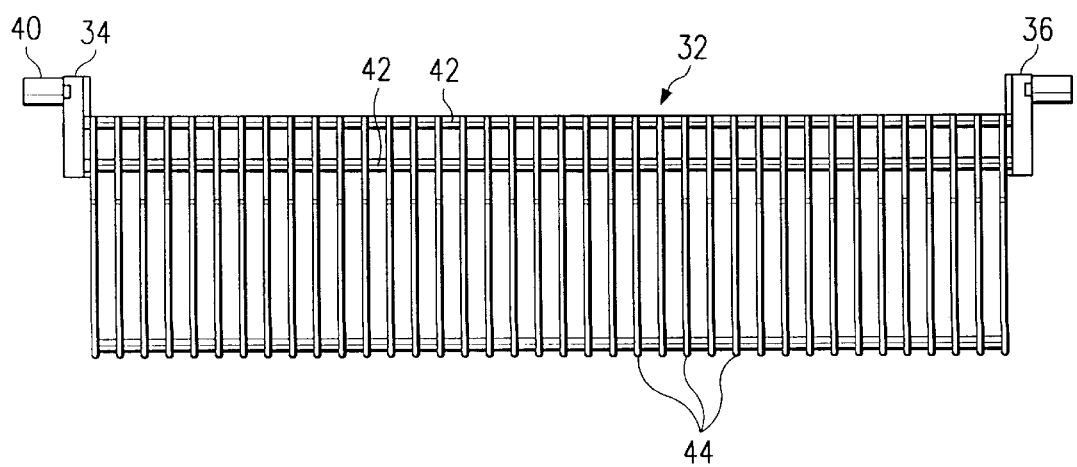
FIG. 6 is a plan view of the wire mold.
Figure 9:
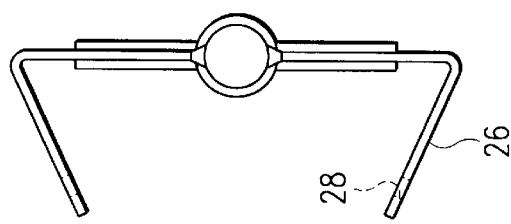
FIG. 9 is an end view of the hinge assembly.
Figure 10:
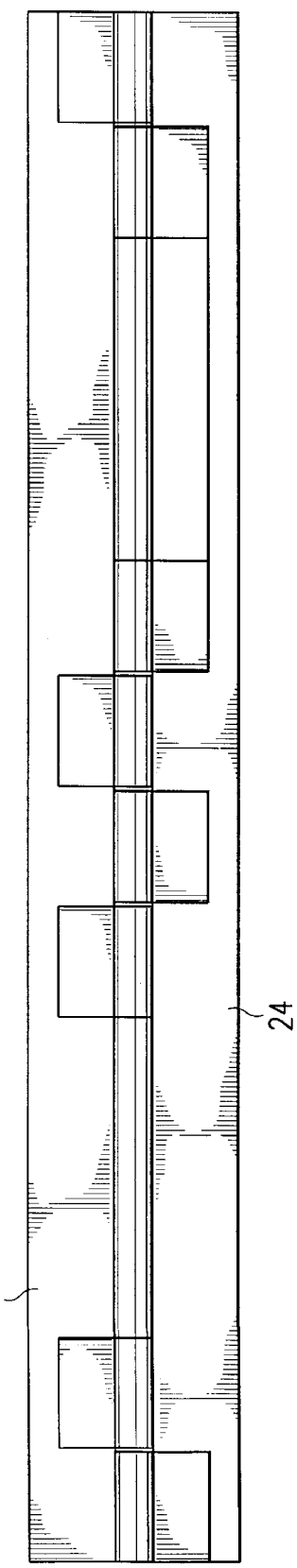
FIG. 10 is a plan view of the hinge assembly.
Figure 11:
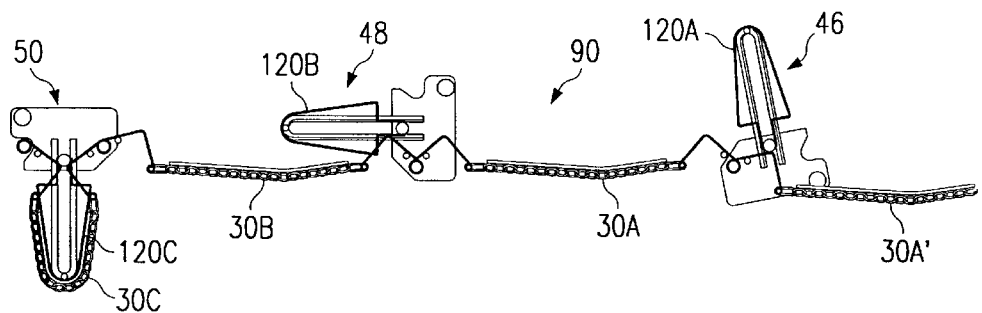
FIG. 11 is a illustrative view of a second embodiment of the present invention.
Figure 12:
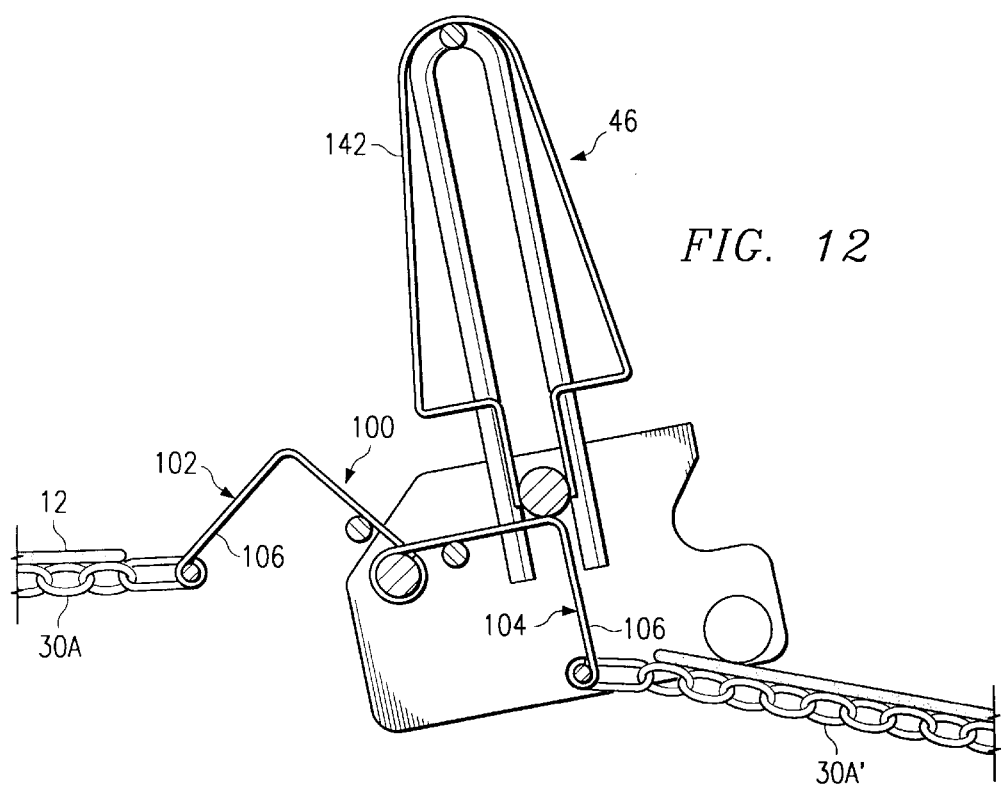
FIG. 12 is a side-view of the mold of the embodiment of FIG. 11 in an upright release position and loading position.
Figure 13:
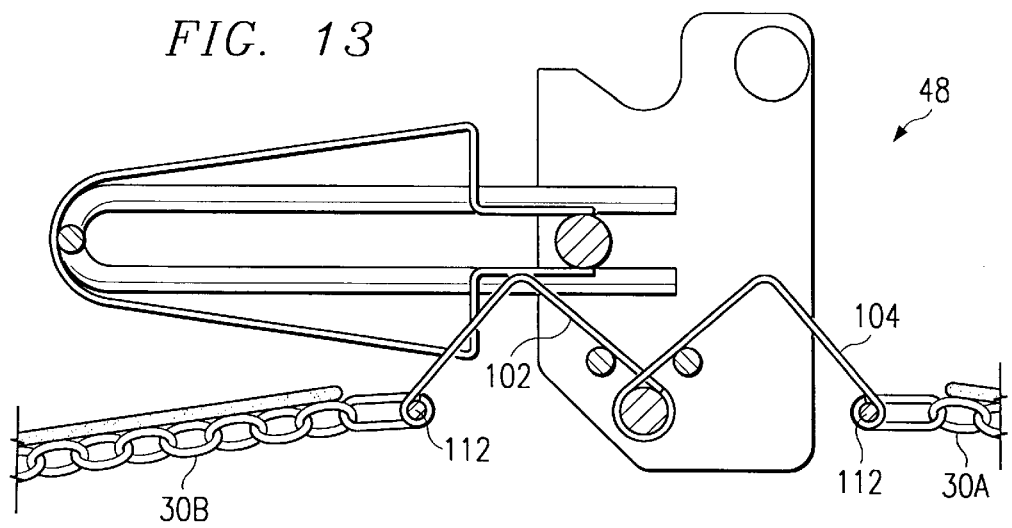
FIG. 13 is a side-view of the mold of FIG. 12 and mesh in the tortilla capture position.

Rods 18 are secured between the drive chains 14 and 16 at spaced intervals so that each of the rods 18 is parallel the others and the spacing is uniform along the entire length of the drive chain. Mounted on each rod 18 is a hinge assembly 20, seen in FIGS. 9 and 10, which includes a first hinge element 22 and a second hinge element 24. The hinge elements 22 and 24 can pivot about the rod 18 on which they are mounted. Each hinge element has a flange 26 with a series of apertures 28 therethrough. The apertures 28 each receive an individual link of a chain mesh 30 that extends between adjacent hinge elements 22 and 24 on rods 18, as best seen in FIGS. 1 and 8. Preferably, the length of the mesh 30 and hinge elements 22 and 24 slightly exceeds the length of the drive chain between the rods so that tension applied to the chains is not carried through the mesh. With reference to FIGS. 5–7, a mold 32 is also pivotally mounted on each rod 18. The mold includes end plates 34 and 36, each having an aperture 38 to receive the rod 18. Extending outwardly from each end plate 34 and 36 is an operating lug 40. A pair of transverse wires 42 extend between the end plates 34 and 36 and support a series of mold wires 44 which define a desired external configuration for shaping the taco to be cooked. As shown, the mold wires 44 resemble a Christmas tree in cross-section.

Figure 2:
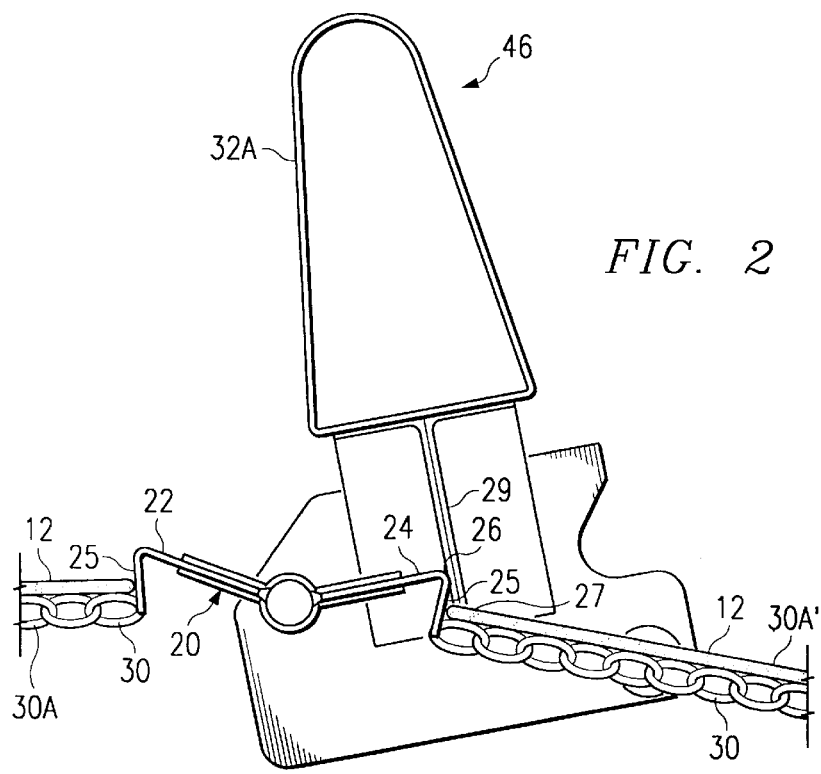
FIG. 2 is a side view of the mold in an upright release position and loading position.
Figure 3:
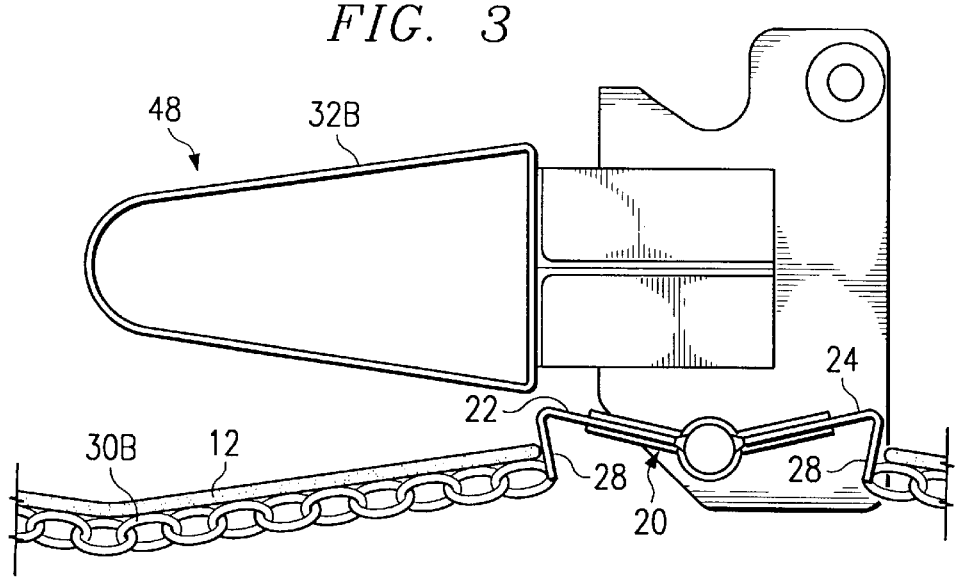
FIG. 3 is a side view of the mold and mesh in the tortilla capture position.
Figure 4:
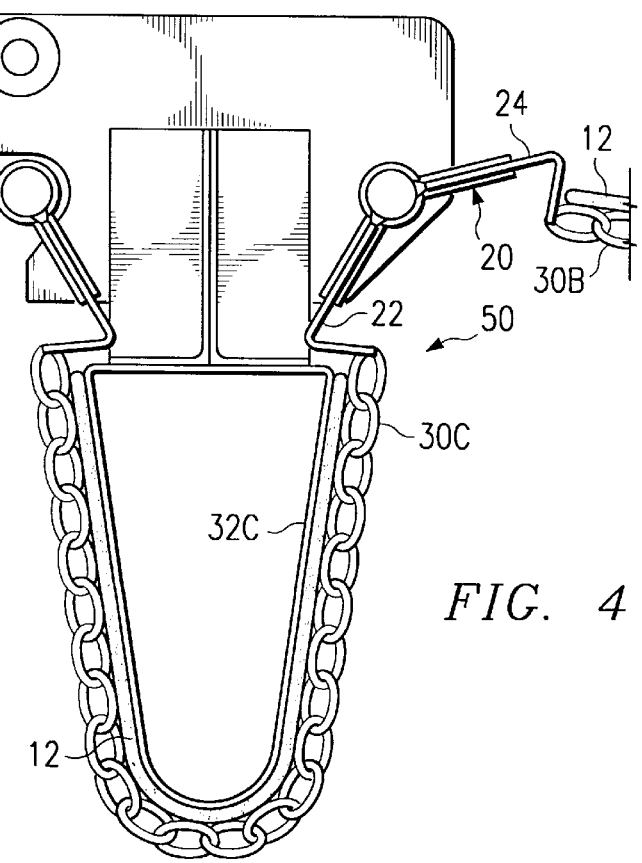
FIG. 4 is a side view showing the mold and mesh moving through the oil tank towards the release position.

With reference to FIGS. 1–4, the operation of the apparatus 10 can be described. In position 46, the operating lug 40 of mold 32A has been operated to pivot the mold 32A into a folding position, as shown, where a tortilla 12 can be laid on the mesh 30A immediately in front of the mold 32A and/or on the mesh 30A' immediately behind the mold 32A. As best seen in FIGS. 1 and 2, the flange 26 of the hinge elements 22 and 24 forms a backstop for the mold 32 in the loading position. The operating lug 40 is then contacted to pivot the mold toward the mesh in front thereof as illustrated by mold 32B moving toward engagement with the mesh 30B at position 48. Finally, the operating lug 40 is further engaged to move the mold 32C into full engagement with the mesh 30C at position 50 to trap the tortilla therebetween and force the taco into the shape determined by the exterior surface profile of the mold wires 44. Simultaneously, the fryer causes the rods 18 to move closer to each other so that the mesh 30C lies against the exterior surface of the mold 32C for the entire length of the mold.

In the configuration of mold 32C and mesh 30C, the taco captured therebetween is moved through the heated oil in the fryer until the taco has been adequately cooked. As the mold and mesh exit the cooking vat, the rods 18 are separated again the full distance permitted by the intervening drive chains and the operating lug 40 is again contacted to pivot the mold into the release position as illustrated by mold 32A. The cooked taco can be permitted to drop from the mold in the release position and packaged for shipment. Alternatively, a positive mechanism can be provided to remove the cooked taco as the mold moves to the release position, if desired.

Because the taco is trapped between the mold and the mesh, vibration and speed in the fryer can be increased without concern for the u-shape tortilla shifting. The resulting taco is also formed into a much more uniform shape which aids in the packaging of the taco. Smaller and more uniform packages can be utilized when the product is more uniform in u-shape, reducing packaging costs and shelf space at the store.

The taco can be positioned on the mesh while the mold is in the loading position either by hand or automatically. Preferably, all of the apparatus 10 is made of stainless steel. It will be expected that each wire mold will be constructed to form a given size taco. If a different sized taco is to be cooked, the size of the wire mold will change to accommodate it.

As seen in FIGS. 1 and 2, the first hinge element 22 and second hinge element 24 have a bent configuration to form a wall 25 which extends upward from the surface of the mesh 30. The wall 25 extends the entire width of the mesh. When a tortilla is dropped onto the mesh, the forward edge 27 of the tortilla will come in contact with the wall 25 of the second hinge element 24. The lateral position of the tortilla across the width of the mesh is not critical as the wall 25 extends the entire width of the mesh. Therefore, the tortilla is more accurately positioned relative the mesh than was possible with the prior design utilizing a pair of pins for positioning. The back edge of the tortilla could also come in contact with the wall 25 of the second hinge element 22. The wall 25 preferably extends about ½ inch above the mesh 32. This design more accurately positions the tortilla on the mesh and reduces the possibility of defective J's being formed. Also, the elimination of the positioning pins prevent the tortilla from being stuck to the pins during frying. As a further advantage, the trunk portion 29 of the wire molds 32 also provides a stop for the tortilla. The trunk portion preferably extends about 1 inch above the mesh.

With reference now to FIGS. 11–21, a second embodiment of the present invention is illustrated as taco frying apparatus 90. Many elements of the apparatus 90 are the same as discussed previously with regard to taco frying apparatus 10 and are identified by the same reference numerals. However, the apparatus 90 includes a hinge assembly 100 with a first hinge element 102 and a second hinge element 104.

Figure 19:
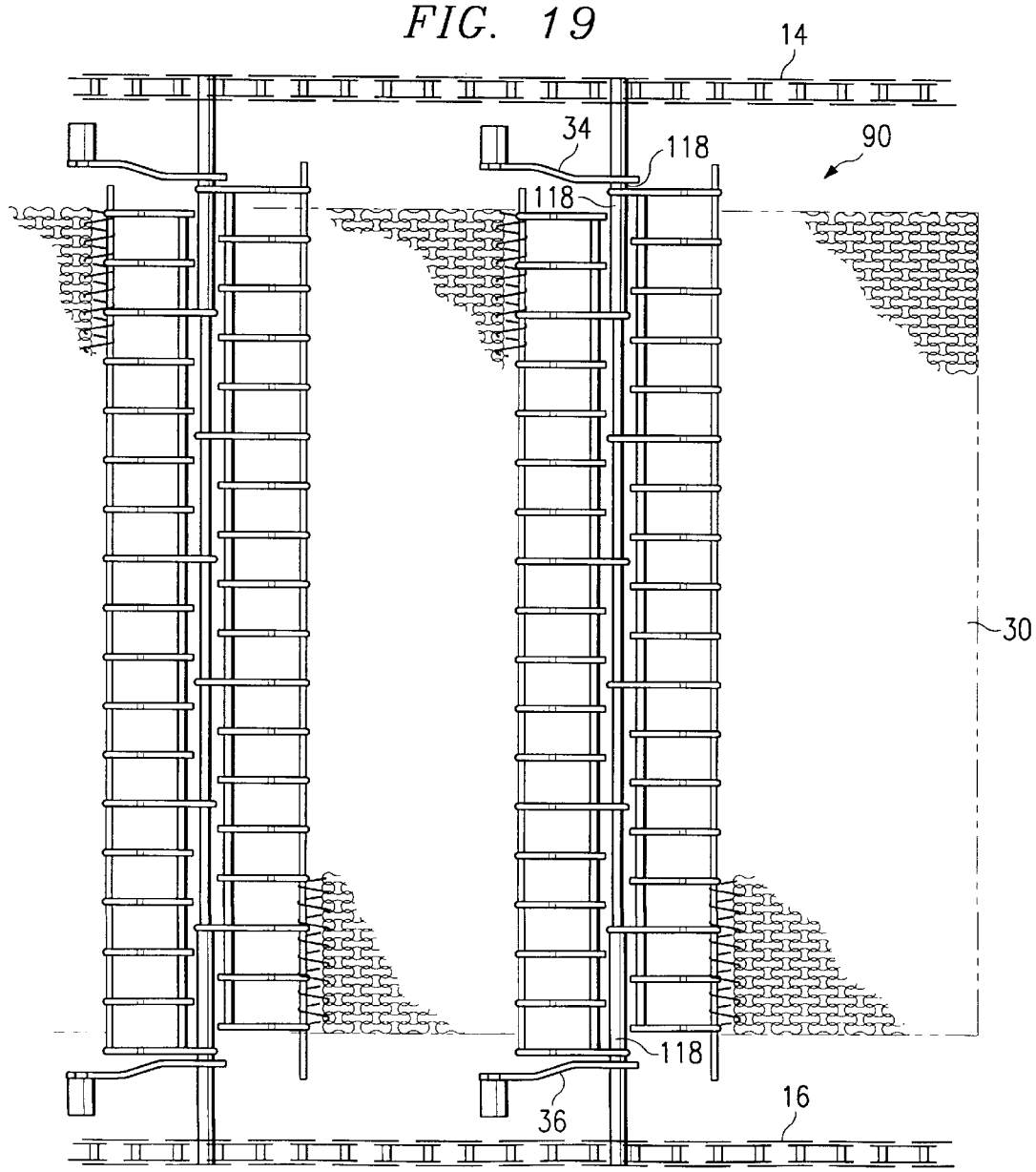
FIG. 19 is a plan view of the second embodiment of the present invention.
Figure 20:
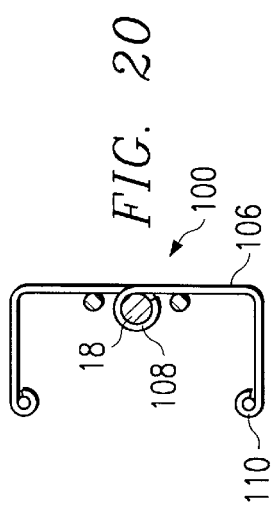
FIG. 20 is an end-view of the hinge assembly of the second embodiment.
Figure 21:
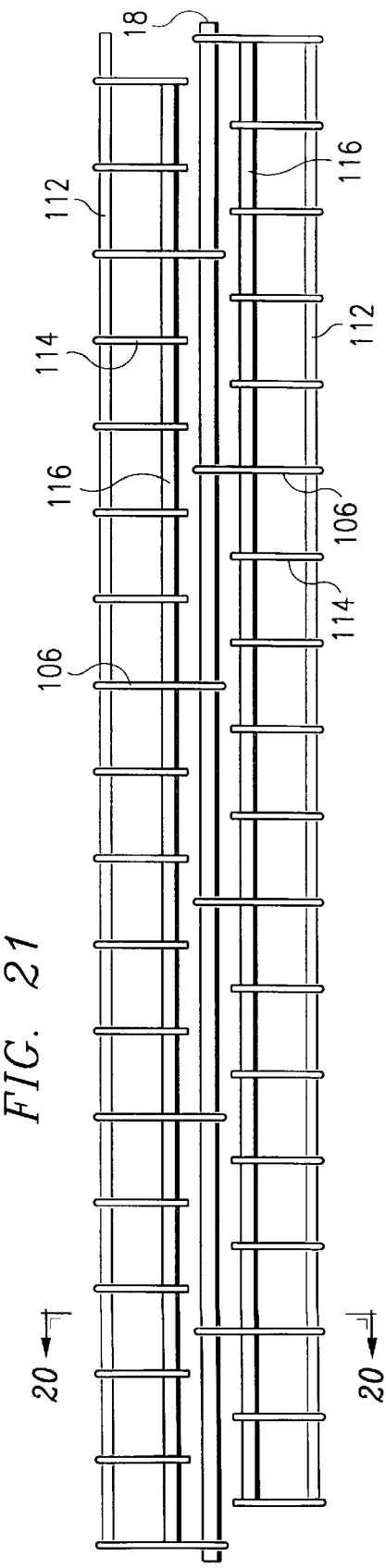
FIG. 21 is a plan view of the hinge assembly of the second embodiment.

As shown in FIGS. 20 and 21, each of the hinge elements 102 and 104 are formed of a plurality of L-shaped elements 106 having rod eyes 108 at one end through which rod 18 passes. At the opposite ends, L-shaped elements 106 have mesh eyes 110 through which a mesh rod 112 passes to which is secured the chain mesh 30. Between the L-shaped elements 106 are a plurality of L-shaped elements 114 which have only mesh eyes 110 at one end. The L-shaped elements 106 and 114 are welded in parallel alignment to a hinge element bar 116, as shown, to form the hinge element. As can best be seen in FIG. 19, a series of spacers 118 are placed on rod 18 to space the hinge elements 102 and 104 in a precise orientation between the end plates 34 and 36 for reasons discussed hereinafter.

As seen in FIG. 16, the mold 120 is formed of two heavy transverse wires 122 and 124 secured at their ends to heavy U-shaped end wires 126 and to the end plates 34 and 36. The individual mold wires 128 are secured at their top to transverse wire 122 and at their bottom to transverse wire 124. Again, the mold wires 128 have a generally Christmas tree shape and cross section to properly mold the taco.

Figure 14:
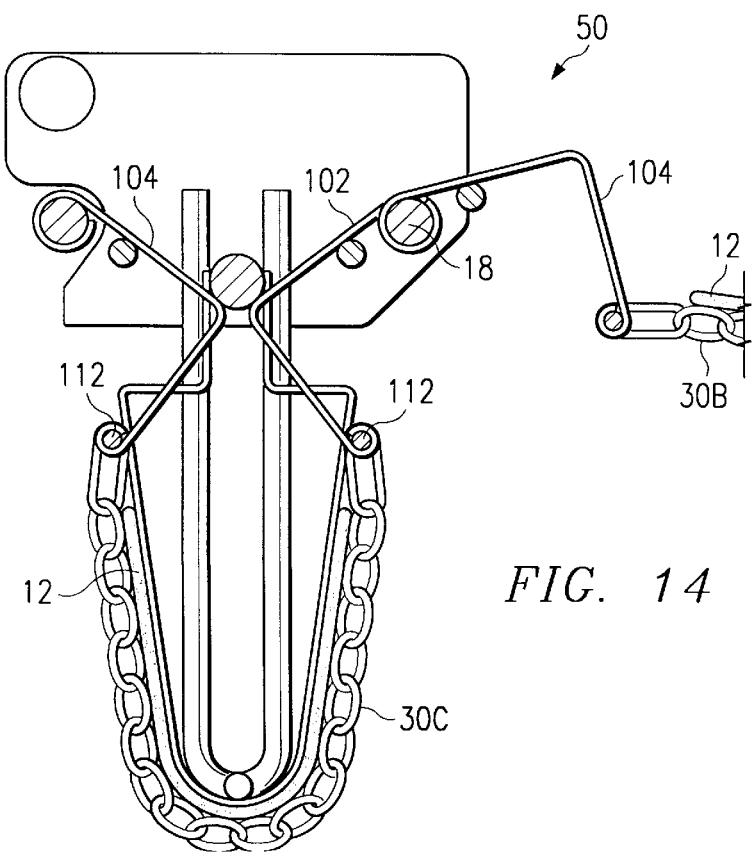
FIG. 14 is a side-view showing the mold and mesh moving through the oil tank toward the release position.
Figure 18:
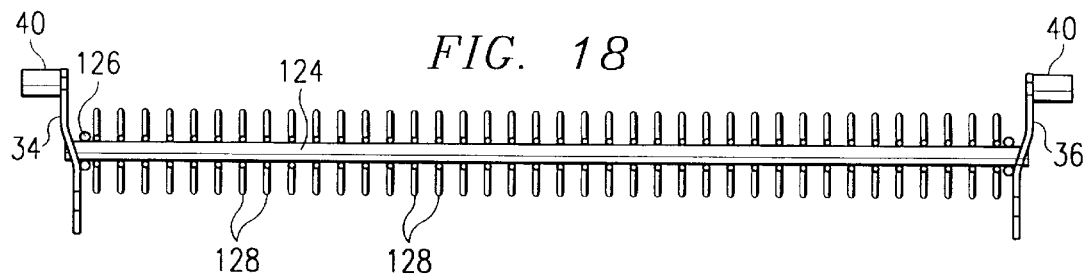
FIG. 18 is a bottom view of the wire mold.

As can best be seen in FIG. 19, the spacers 118 space the L-shaped elements 106 and 114 of the hinge elements 102 and 104 in a precise orientation relative to the mold wires 128 so that, when the apparatus is in the positions 48 and 50, as discussed above, a portion of the L-shaped elements 106 and 114 move between the mold wires 128, providing a particularly compact configuration. As can be seen, when the hinge elements 102 and 104 are pivoted between the mold wires 128, the mesh rods 112 will limit this motion by contacting the mold wires 128, as seen in FIG. 14.

In one taco frying apparatus constructed in accordance with the present teachings, thirty eight mold wires 128 form each mold 120. Four or five L-shaped elements 106 are used in each hinge element 102 and 104 while fourteen L-shaped elements 114 are used in each hinge element 102 and 104. Clearly, any number of mold wires and L-shaped elements 106 and 114 can be utilized, as required.

The taco frying apparatus 90 works in the same manner as taco frying apparatus 10. The tortilla 12 can be laid on the mesh 30A in front of mold 120A and/or on the mesh 30A' behind mold 120A. The L-shaped elements 106 and 114 form a backstop. The operating lug 40 is then contacted to pivot the mold toward the mesh in front thereof as illustrated by mold 120B moving toward engagement with the mesh 30B at position 48. Finally, the operating lug 40 is further engaged to move the mold 120C into full engagement with the mesh 30C at position 50 to trap the tortilla therebetween and force the taco into the shape determined by the exterior surface profile of the mold wires 128. Simultaneously, the fryer causes the rods 18 to move closer to each other so that the mesh 30C lies against the exterior surfaces of the mold 120C for the entire length of the mold.

The taco frying apparatus 90 has a number of advantages. For example, the taco frying apparatus 90 can be adapted for frying tortillas of different size by simply changing the length of the mesh 30 and the length of the L-shaped elements 106 and 114. The same mold 120 can be used for a range of tortilla sizes. For example, if a 5½ tortilla is used, the mesh 30 may be 5½ long as well. The chains 14 and 16 are about 8" long. Thus, each of the L-shaped elements will have lengths of 1¼ between rod 18 and mesh rod 112. A different sized tortilla can be accommodated by simply changing the length of the mesh 30 and of the L-shaped elements 106 and 114. For example, it is believed that tortillas between 5" in diameter and 7" in diameter can be readily accommodated in taco frying apparatus 90 with use of the same mold 120.

Another advantage of the present invention is the fact that the tortilla 12 is easily centered on the mesh with the assistance of the L-shaped elements 106 and 114 which form shoulders to center the tortilla. As the mesh wraps about the mold 120, the entry of portions of the L-shaped elements 106 and 114 between the mold wires 128 until the mesh rod 112 contacts the mold wires 128 will ensure that no portion of the tortilla will be bent around the bottom 140 (FIG. 16) of the mold wires 128. The tortilla is thus reliably positioned on the flat outside surface 142 (FIG. 12) formed by the mold wires 128 as desired.

Although several embodiments of the present invention have been illustrated in the accompanying drawings and described in the foregoing detailed description, it will be understood that the invention is not limited to the embodiments disclosed, but is capable of numerous rearrangements, modifications and substitutions of parts and elements without departing from the scope or spirit of the invention.

I claim:

1. A taco frying apparatus, comprising:
   first and second parallel chain elements;
   first and second rods extending between said first and second chain elements, the first and second rods parallel each other and spaced a predetermined distance along the chain elements from each other;
   a first hinge assembly pivotally mounted to said first rod;
   a mesh extending between the first and second rods and secured at one end thereof to said first hinge assembly; and
   a mold pivotally mounted to said first rod for pivotal motion between a first release position exposing the mesh and a second capture position with the mesh formed over the mold, a portion of the first hinge assembly received within the mold in the second capture position.

2. The taco frying apparatus of claim 1, wherein the first hinge assembly includes a first hinge element and a second hinge element.

3. The taco frying apparatus of claim 1, wherein the mesh is attached to the first hinge assembly by a mesh rod.

4. The taco frying apparatus of claim 1, further comprising an end plate at a first end of the mold, the end plate pivoted to the first rod, the end plate having an operating lug extending therefrom to move the mold between the release position and the capture position.

5. The taco frying apparatus of claim 1, wherein the mold is formed of a series of wire molds.

6. The taco frying apparatus of claim 1, wherein a first end plate is mounted at a first end of the mold and a second end plate is mounted at a second end of the mold, the end plates each having apertures therethrough for passage of the first rod to permit the mold to pivot about the first rod.

7. The taco frying apparatus of claim 1, wherein the first and second hinge elements each contain a plurality of L-shaped members and a hinge element bar.

8. The taco frying apparatus of claim 3 wherein the mesh rod contacts the mold in the second capture position to limit movement of said portion of the first hinge assembly within the mold.

9. The taco frying apparatus of claim 1 wherein the mold is comprised of a pair of U-shaped end wires connected by a pair of transverse wires, the mold further comprising a plurality of mold wires secured between the transverse wires to mold the taco.

10. The taco frying apparatus of claim 1 wherein the first hinge assembly includes a plurality of L-shaped elements having a first end with a rod eye and a second end with a mesh eye, and a plurality of second L-shaped elements having a mesh eye at a first end thereof.

11. The taco frying apparatus of claim 1 further comprising spacers to space said first hinge assembly along said first rod.

12. A taco frying apparatus, comprising:
    first and second parallel chain elements;
    first and second rods extending between said first and second chain elements, the first and second rods parallel each other and spaced a predetermined distance along the chain elements from each other;
    a first hinge assembly pivotally mounted to said first rod, said first hinge assembly including a first hinge element and a second hinge element, each of said first and second hinge elements having a plurality of L-shaped elements having a first end pivotally mounted on the first rod and a second end having a mesh eye, and a hinge element bar securing the L-shaped elements in fixed relationship to each other;
    a mesh extending between the first and second rods and secured at one end thereof to the second end of the L-shaped elements of the first hinge element;
    a mesh rod secured to the mesh and passing through the mesh eyes of said L-shaped elements; and
    a mold pivotally mounted to said first rod for pivotal motion between a first release position exposing the mesh and a second capture position with the mesh formed over the mold, said mold formed of a plurality of individual mold wires, the L-shaped elements of the first hinge element each defining a portion extending between adjacent individual mold wires when the mold is in the second capture position, the mesh rod limiting the degree of movement of the L-shaped elements between the individual mold wires.

13. The taco frying apparatus of claim 12 further comprising at least one spacer mounted on the first rod for spacing said plurality of L-shaped elements along said first rod for movement between the individual mold wires when the mold is in the second capture position.

14. The taco frying apparatus of claim 12 wherein the first and second hinge elements further comprising a plurality of second L-shaped elements secured to the hinge element bar, said second L-shaped elements having a first end with a mesh eye, the mesh rod passing through said mesh eyes of said second L-shaped elements to secure the mesh to the first hinge element.

15. The taco frying apparatus of claim 12 wherein the L-shaped elements act as a backstop.

* * * * *

UNITED STATES PATENT AND TRADEMARK OFFICE
CERTIFICATE OF CORRECTION

PATENT NO : 6,073,544
DATED : June 13, 2000
INVENTOR(S) : John S. Stickle

It is certified that error appears in the above-identified patent and that said Letters Patent are hereby corrected as shown below:

The following should be inserted on the front page of U.S. Patent No. 6,073,544: "NOTICE - The term of this patent shall not extend beyond the statutory expiration date of U.S. Patent No. 5,743,174."

The following should be inserted at the beginning of column 1, line 2 of U.S. Patent No. 6,073,544:

"RELATED APPLICATIONS - This application is a continuation-in-part of prior pending U.S. Application Serial No. 08/788,284 filed January 24, 1997, which issued as U.S. Patent No. 5,743,174 on April 28, 1998."

UNITED STATES PATENT AND TRADEMARK OFFICE
CERTIFICATE OF CORRECTION

PATENT NO : 6,073,544
DATED : June 13, 2000
INVENTOR(S) : John S. Stickle

It is certified that error appears in the above-identified patent and that said Letters Patent are hereby corrected as shown below:

In the Abstract, line 5, "there between" should be replaced with "therebetween".

Column 1, line 38, "lead" should be replaced with "led".

Column 1, line 49, after "parallel", "to" should be inserted.

Column 1, line 67, after "thereof", "." should be inserted.

Column 2, line 8, "accompanied", should read "accompanying".

Column 2, line 63, after "parallel", "to" should be inserted.

Column 3, line 59, after "different", "sized", should be replaced with "size".

UNITED STATES PATENT AND TRADEMARK OFFICE
CERTIFICATE OF CORRECTION

PATENT NO : 6,073,544
DATED : June 13, 2000
INVENTOR(S) : John S. Stickle

It is certified that error appears in the above-identified patent and that said Letters Patent are hereby corrected as shown below:

Column 4, line 11, "prevent" should be replaced with "prevents".

Column 5, line 8 "size" should be replaced with "sizes".

Column 5, Claim 1, lines 42 and 43, after "parallel", "to" should be inserted.

Column 6, Claim 12, lines 27 and 28, after "parallel", "to" should be inserted.

Column 6, Claim 14, line 58, "comprising" should be replaced with "comprise".

Signed and Sealed this

Twenty-fourth Day of April, 2001

Attest:

NICHOLAS P. GODICI

*Attesting Officer*     *Acting Director of the United States Patent and Trademark Office*